Dec. 31, 1957  M. M. WIRTH  2,818,428
PRODUCTION OF ACETIC ACID AND ESTERS THEREOF
Filed June 14, 1952
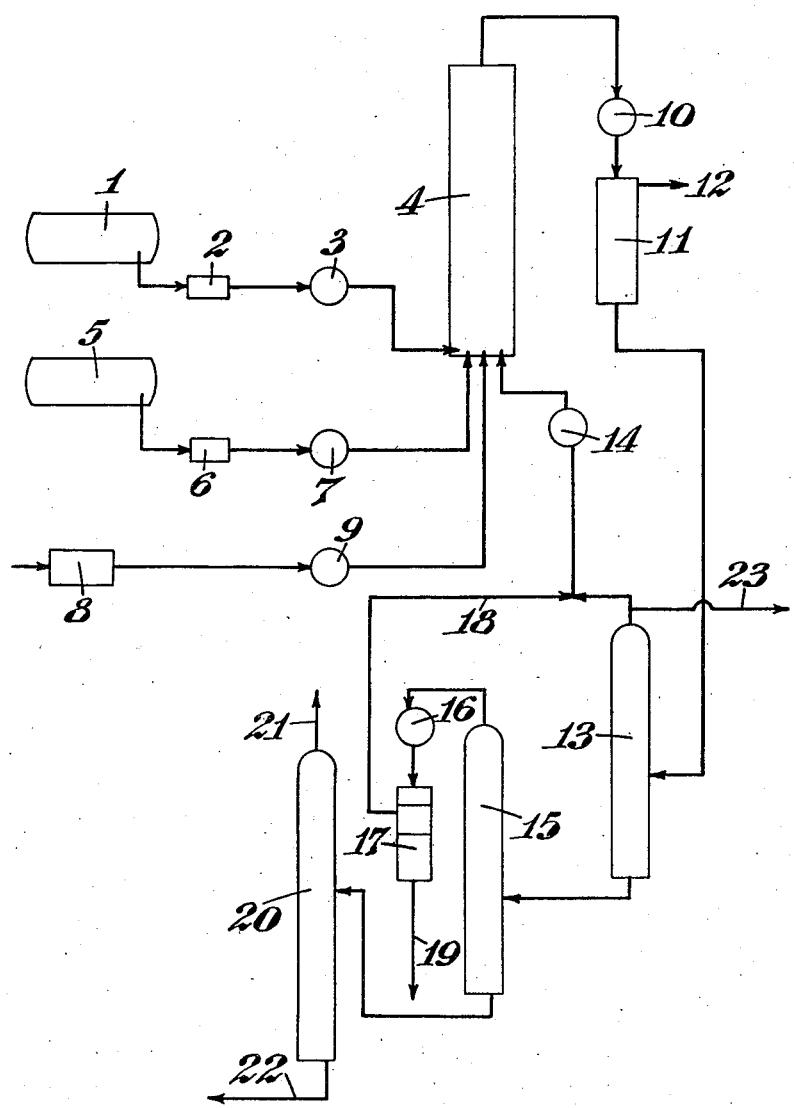
Inventor:
MAX MARIN WIRTH
BY:
Morgan, Finnegan & Durham
Attorneys United States Patent Office 2,818,428
Patented Dec. 31, 1957

2,818,428

PRODUCTION OF ACETIC ACID AND ESTERS THEREOF

Max Marin Wirth, Sunbury-on-Thames, England, assignor to The British Petroleum Company Limited Application June 14, 1952, Serial No. 293,510

Claims priority, application Great Britain June 15, 1951

9 Claims. (Cl. 260—495)

This invention relates to a new process for the production of acetic acid and for the production of secondary butyl acetate.

It is known that secondary butanol can be dehydrogenated to methyl ethyl ketone and that, under suitable conditions, this may be oxidised to yield two molecules of acetic acid per molecule of ketone. Thus a process has been described in United States specification No. 2,354,683 by which lower aliphatic secondary alcohols are converted to the corresponding ketone by oxidation at temperatures up to 100° C.

It is an object of the present invention to provide a process for the conversion of secondary butanol to acetic acid in a single reaction stage. It is a further object to provide a process for the conversion of secondary butanol to secondary butyl acetate in a single reaction stage. Other objects will appear hereinafter.

According to the invention, acetic acid and/or its secondary butanol ester is produced by a process which comprises treating secondary butanol, in the liquid phase, with molecular oxygen, or a gaseous mixture in which it is contained, at a temperature of at least 120° C. and at elevated pressure and in the presence of a metal oxidation catalyst.

Preferably the reaction temperature is maintained in the range 120°–160° C. and more particularly in the range 130°–160° C. While the reaction pressure must, in any case, be sufficient to maintain the organic reactants in the liquid phase, preferably the pressure exceeds 150 lbs./sq. in. and, for greater preference, exceeds 300 lbs./sq. in.

Usually it has been found convenient to subject the secondary butanol to oxidation in the presence of a solvent, lower fatty acids being preferred for this purpose and, in particular, acetic acid. Conveniently the solvent constitutes from 10–30% vol./vol. and preferably 20% vol./vol. of the total charge.

The catalyst for the oxidation may be any of the conventional oxidation catalysts such as manganese or cobalt salts. The preferred salts are acetates since these do not introduce any foreign organic radicals into the reaction mixture when, during oxidation, the actalyst undergoes several changes whereby the metal atom is raised to a higher valence state and part of the organic residue of the molecule is discarded. The catalyst concentration is conveniently in the range 0.1–3%, for example 1% wt./wt. of the charge, although less may be used and a greater amount has no deleterious effect on the course of the reaction.

In order that the reaction may proceed readily from the start it is desirable to add a relatively small proportion of an initiator to the charge, that is a compound which itself oxidises more readily than sec.-butanol thereby providing a source of free radicals, or a preformed peroxide which will decompose to generate free radicals under the conditions of the reaction. It has been mentioned above that methyl ethyl ketone is an intermediate formed in the course of the oxidation and for this reason it is a particularly desirable initiator since it will in no way contaminate the products of the reaction. Other suitable initiators are aliphatic aldehydes e. g. acetaldehyde. The amount of initiator used may vary from about 1% to about 20% vol./vol. on the total charge and may be added at the start of oxidation or gradually in the course of the reaction.

The reaction may be carried out batchwise or in a continuous manner. In the latter case the desired product, acetic acid, may be removed continuously for example by fractionation or by neutralisation or saponification, and fresh sec.-butanol added as required. With methyl ethyl ketone as initiator, this can be recirculated to the reactor in continuous operation.

The reactor is preferably fabricated from a steel resistant to corrosion by lower organic acids; as an example chrome-nickel steels of the type of Firth F. M. B. and high nickel alloys of the type of the Hastelloys are satisfactory in this respect. The reactor should be fitted with internal cooling coils in order to remove the heat of reaction, or the reactor contents may be circulated through an external heat exchanger or external cooling jackets may be provided. It is preferred that the reactor be operated full of liquid, the oxidising gas passing in a dispersed state up an elongated vertical reactor. Agitation by stirrer may be employed if desired to increase the contacting efficiency of the liquid reactants and the oxidising gas.

The process of the invention will now be described, by way of example, with reference to the diagrammatic flow sheet accompanying the specification.

Secondary butanol is taken from the feed tank 1 and raised to the operating pressure by the pump 2, passing through the preheater 3 to the oxidation reactor 4. Acetic acid used as reaction medium is taken by the pump 6 from the tank 5 through the heater 7 to the reactor 4. Air or oxygen is raised to the reaction pressure by the compressor 8 and passed through the heater 9 to the reactor 4.

The products pass from reactor 4 through the cooler 10 into the gas separator 11, from which unreacted gas (mainly nitrogen when air is used as oxidising gas) is passed to waste by the line 12. Obviously volatile acids present in gases withdrawn by the line 12 may be recovered by a suitable scrubbing operation, for example with water, or by passing through absorbent material such as charcoal if desired. With the vessel 11 operated at the preferred pressure of about 300 lbs. per sq. in., losses of acids in the gases from 12 are relatively small. The liquid from 11 is passed, after reducing the pressure to about atmospheric in one or more stages, to the fractionator 13. In this, low boiling material including methyl ethyl ketone and acetone, is taken overhead and returned through the heater 14 to the oxidiser 4. The residue from 13 passes to the fractionator 15, the purpose of which is to remove the water remaining in the oxidate. This water is removed as the ternary azeotrope with secondary butanol and secondary butyl acetate and/or as the binary azeotrope with secondary butanol and secondary butyl acetate. The proportions of secondary butanol and secondary butyl acetate in the overheads from 15 will obviously depend on the extent of conversion of the secondary butanol in the oxidiser 4. The overhead from 15 is cooled in 16 and passed to the decanting vessel 17, where the distillate separates into two phases. The organic phase, comprising secondary butanol and the acetate, is returned to the oxidiser 4 by the line 18 through the heater 14. The aqueous phase is removed to storage by the line 19. A small quantity of the alcohol may, if desired, be recovered by working up this aqueous phase, the alcohol being returned to the oxidation. The residue from 15, comprising excess butanol and butyl acetate and the acidic products of the oxidation, is passed to the fractionator 20. Here the butanol and butyl acetate are taken overhead and returned to the oxidiser 4 or to the feed tank 1 by the line 21. The residue from 20 is taken to storage by the line 22. This residue is substantially anhydrous and contains some formic acid, a small proportion of propionic acid and a little high boiling by products of the oxidation, but the bulk (70–90%) of the material is acetic acid. The acetic acid is purified by a system (omitted from the figure) operated in known manner.

Many obvious modifications to the system may be made. Thus the preferred initiator (methyl ethyl ketone) may be added to the butanol in tank 1, instead of being recycled from the fractionator 13.

Acetic acid used as solvent is a product of the process and may be supplied from the purified product. As the quantity of by-products present in the residue from 20 is, in general, small, this residue can usually be used as solvent in place of purified acetic acid. The overheads from the fractionator 13 may contain low boiling constituents which oxidise slowly and if necessary to prevent such materials building up in the oxidation system, a proportion of the overheads from 13 may be purged by the line 23.

When operating according to the above description, acetic acid is the main product. That is to say the overheads from 20 and the organic phase from 17, as well as sufficient water to prevent dehydration, are recycled to the oxidiser 4 whilst acetic acid is removed from the system in the bottoms from 20. These conditions will not favour the formation of further quantities of sec-butyl acetate.

To produce mainly sec-butyl acetate it is desirable to recycle the bottoms from 20 to the oxidiser 4, whilst the overheads from 20 and organic phase from 17 are combined, dehydrated if necessary, and passed to a further fractionating column in which sec-butanol and sec-butyl acetate are readily separated as they do not form an azeotrope. The overheads consisting of sec-butanol will be recycled to the oxidiser whilst the desired sec-butyl-acetate is removed from the system as bottoms.

Under these conditions the formation of sec-butyl-acetate will be favoured since this is a secondary reaction dependent, not on the oxidation process itself, but merely on the respective concentrations of the four components in the reactor.

Experiments carried out in sealed tubes under a nitrogen atmosphere showed that at 148° C. for example, acetic acid and sec-butanol readily undergo esterification and that the equilibrium constant is not very much in favour of either the forward or the back reaction.

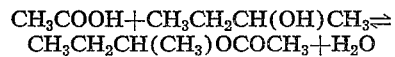

$$CH_3COOH + CH_3CH_2CH(OH)CH_3 \rightleftharpoons CH_3CH_2CH(CH_3)OCOCH_3 + H_2O$$

This is why it is possible to obtain either acetic acid or sec.-butyl acetate as main product as above described.

The process is further illustrated, but in no way limited, by the following examples. Example 1 is provided for purposes of comparison only.

EXAMPLE 1

One hundred and fifty ccs. of sec.-butanol was oxidised with a stream of air in the absence of any metal catalyst. The temperature of the reactor was kept just below the boiling point of the alcohol and the pressure was atmospheric. A small amount of tertiary butyl hydroperoxide (0.3 gram) was used to initiate the reaction. After 5 hours of oxidation the product was found to contain only 13.3 millimol. of methyl ethyl ketone, 10.9 millimol. of hydrogen peroxide and 0.7 millimol. of acids, representing a conversion of 0.8 mol. percent.

EXAMPLE 2

A charge was made up of 534 grams of sec.-butanol 198 grams of acetic acid, 107 grams of methyl ethyl ketone and 8 grams of manganese acetate. This was placed in a stainless steel reactor provided with an efficient stirrer operating at 1400 R. P. M. The temperature was then raised to 130° C. and the pressure built up to 300 lbs./sq. in. with air. The rate of gas take-off was adjusted at 300 litres gas/hour (measured at 760 mm. Hg and 20° C.) and the pressure maintained at 300 lbs./sq. in. throughout the reaction. During the initial two hours of oxidation the reaction was very fast and exothermic. The exit gas contained less than 4% by volume of free oxygen. After two hours the temperature was gradually raised to 160° C. After 4 hours the reaction was stopped and the product was analysed. The results may be found in the following table:

Table

| Compound | Charge | | Oxidate | |
|---|---|---|---|---|
| | Grams | Mol | Grams | Mol |
| Acetic acid | 198 | 3.3 | 352 | 5.9 |
| sec.-Butyl acetate | 0 | 0.0 | 332 | 2.9 |
| sec.-Butanol | 534 | 7.2 | 168 | 2.3 |
| Methyl-ethyl ketone | 107 | 1.5 | 70 | 1.0 |
| Water | 0 | 0.0 | 52 | 2.9 |
| Total | 839 | 12.0 | 974 | 15.0 |
| Total acid formed (SV increase) | | | 325 | 5.4 |
| Butanol consumed (excluding ester) | | | 153 | 2.1 |
| Methyl-ethyl ketone consumed | | | 38 | 0.5 |

Of the total acid 79% by wt. was acetic acid, 5% was propionic acid and 16% was formic acid and oxygenated fatty acids.

EXAMPLE 3

In order to show that sec-butyl acetate is hardly oxidised under the reaction conditions so that it can be obtained as a major product without simultaneous formation of large quantities of free acetic acid, the results of an additional experiment are now given.

A charge was made up of 637 g. of sec-butyl acetate, 236 g. of acetic acid, 127 g. of methyl-ethyl-ketone and 8 g. of manganese acetate. This was subjected to oxidation in the reactor described in Example 2 and under the same conditions except that the temperature was gradually raised from 145° C. to 165° C. over a period of 2.5 hours. Oxygen absorption was slow and ceased altogether after 2.5 hours, so that the run was interrupted. The analysis of feed and product are given in the following table:

Table

| Compound | Charge | Oxidate |
|---|---|---|
| Saponification value (mg.KOH/g.) | 640 | 738 |
| Carbonyl as percent w./w.M.E.K. | 12.5 | nil |

It is obvious from these results that only the methyl ethyl ketone originally added was oxidised, without inducing the oxidation of any sec-butyl acetate.

I claim:

1. A process for the production of a reaction product consisting predominantly of acetic acid and secondary butyl acetate, which comprises treating secondary butanol, in the liquid phase and dissolved in a lower fatty acid solvent, with a gas consisting at least in part of molecular oxygen at a temperature of at least 120° C. at a pressure of at least 150 lbs./sq. in. and in the presence of a metal oxidation catalyst selected from the group consisting of manganese salts and cobalt salts and in the presence of methyl ethyl ketone as an initiator.

2. A process according to claim 1, in which the temperature is maintained in the range of 130° C.–160° C.

3. A process according to claim 1, in which the pressure exceeds 300 lb./sq. in.

4. A process according to claim 1, in which the solvent is acetic acid.

5. A process according to claim 1 in which the solvent is in an amount from 1 to 3 volumes per 10 volumes of the total charge.

6. A process according to claim 1, in which the initiator is added in the proportion from 1–20% vol./vol. of the total charge.

7. A process according to claim 1, operated in a continuous manner in which the acetic acid and secondary butyl acetate produced in the reaction are separated, the acetic acid being removed as a desired product and the secondary butyl acetate being recycled to the reaction zone.

8. A process according to claim 1, operated in a continuous manner in which the acetic acid and secondary butyl acetate produced in the reaction are separated, the secondary butyl acetate being removed as a desired product and the acetic acid being recycled to the reaction zone.

9. A process according to claim 1 in which the catalyst is a metal acetate in a concentration within the range of 0.1–3% wt./wt. of the charge.

References Cited in the file of this patent

UNITED STATES PATENTS

| | | |
|---|---|---|
| 2,299,013 | Flemming | Oct. 13, 1942 |
| 2,354,683 | Hull | Aug. 1, 1944 |
| 2,456,683 | Deanesley | Dec. 21, 1948 |